May 13, 1924.
W. Z. WOODSTOCK
AUTOMOBILE LOCK
Filed Sept. 10, 1923
1,494,300
2 Sheets—Sheet 1
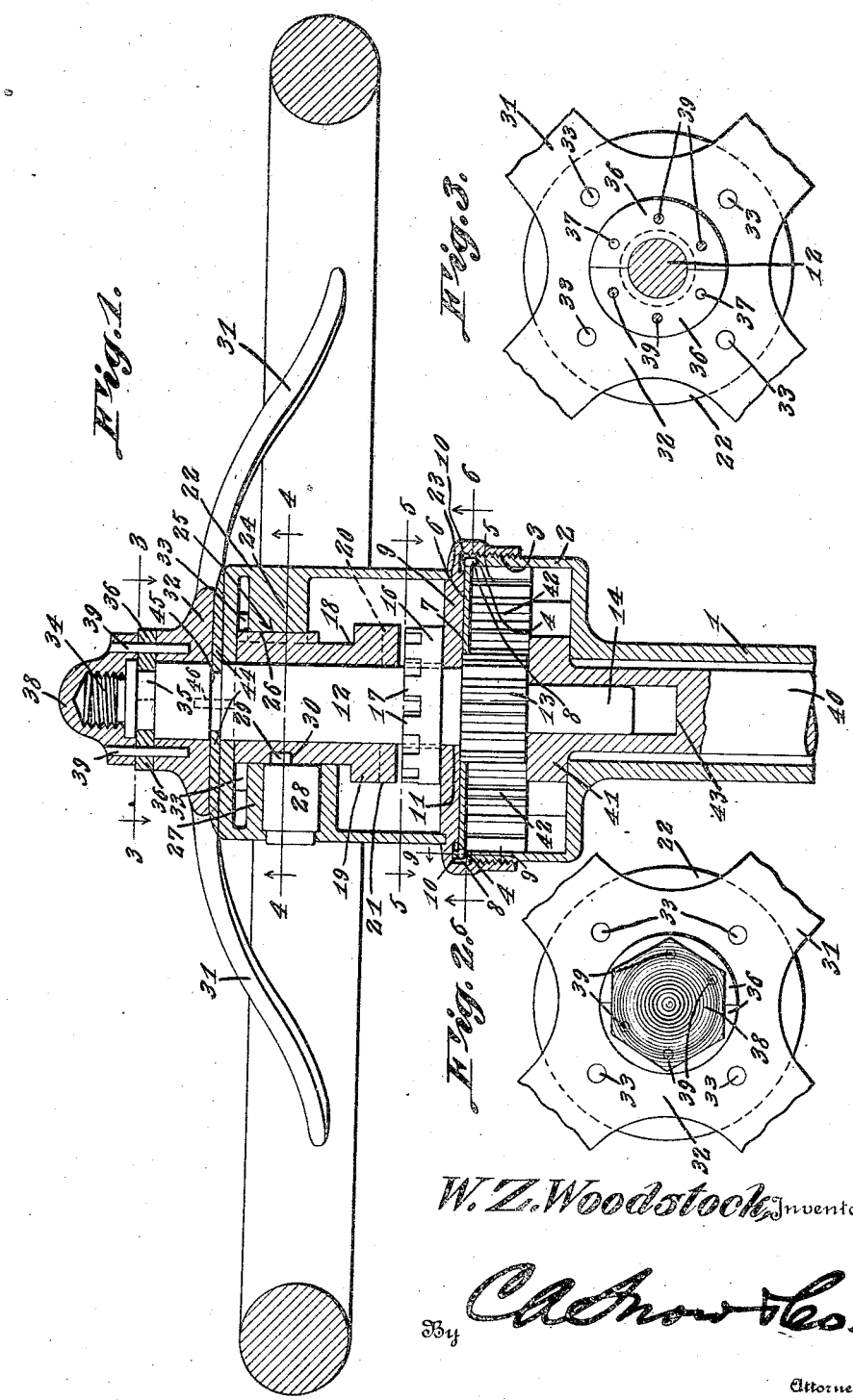

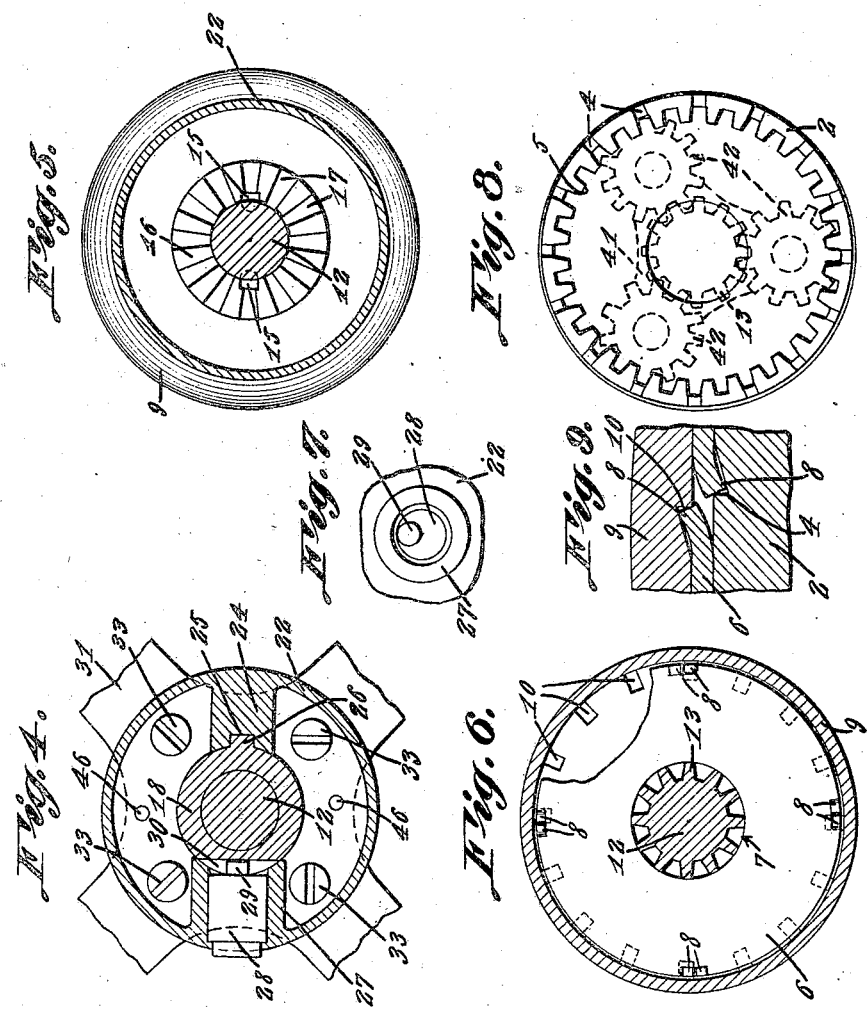

Patented May 13, 1924.

1,494,300

UNITED STATES PATENT OFFICE.

WARREN Z. WOODSTOCK, OF WILMINGTON, DELAWARE.

AUTOMOBILE LOCK.

Application filed September 10, 1923. Serial No. 661,911.

*To all whom it may concern:*

Be it known that I, WARREN Z. WOODSTOCK, a citizen of the United States, residing at Wilmington, in the county of New Castle and State of Delaware, have invented a new and useful Automobile Lock, of which the following is a specification.

This invention relates to an automobile lock of that type whereby the steering wheel can be readily uncoupled from or coupled to the steering gear, one of the objects of the invention being to provide a simple and efficient device of this character which is durable and compact in construction and will serve as a means for positively preventing manipulation of the steering mechanism when the wheel is uncoupled, unless the parts are reset by the insertion of a proper key.

A further object is to provide means for holding the various parts together so as to prevent access to the interior mechanism after the parts have been assembled.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings—

Figure 1 is a central vertical section through the structure constituting the present invention.

Fig. 2 is a plan view of the hub portion of the steering wheel.

Fig. 3 is a section on line 3—3, Fig. 1.

Fig. 4 is a section on line 4—4, Fig. 1.

Fig. 5 is a section on line 5—5, Fig. 1.

Fig. 6 is a section on line 6—6, Fig. 1.

Fig. 7 is an inner end elevation of the clutch shifting eccentric.

Fig. 8 is a plan view of the internal gear forming a part of the steering mechanism, other gears being indicated by broken lines.

Fig. 9 is a section on line 9—9, Fig. 1.

Referring to figures by characters of reference 1 designates a tubular steering post having an enlarged cylindrical head 2 at its upper end exteriorly screw threaded as at 3 and provided in its upper edge with notches 4. This head is formed with an internal gear 5.

Fitted on the top of the head 2 is a disk 6 provided with a central opening 7 and formed, at its periphery, with ears 8 some of which are struck upwardly while others are struck downwardly as shown particularly in Fig. 9. A screw cap 9 extends around and engages the threaded portion of the head 2 and has spaced notches 10 in its inner surface adapted to engage the upwardly extending ears 8 so that disk 6 and its ears thus act as a lock washer to prevent the screw cap from being unscrewed from the head.

Cap 9 has a central opening 11 and mounted for rotation in this opening is a short spindle 12 formed with or secured to a gear 13. The upper end of this gear fits against the cap 9 and rotates within the opening 7 in disk 6. The spindle has a reduced portion 14 extending downwardly from the gear.

Secured to spindle 12 by means of opposed keys 15 is a clutch member 16 adapted to bear downwardly on the cap 9 and provided with radial grooves such as shown at 17.

Slidably mounted on spindle 12 is a sleeve 18 provided at its lower end with a clutch head 19 having radial grooves 20 corresponding with the grooves 17 and providing radial teeth 21 therebetween. A cylindrical housing 22 extends around the spindle 12 and has its open lower end projecting into and adapted to rotate within a circular groove 23 formed in the upper face of the cap 9. This housing has an inwardly extending lug 24 provided with a keyway 25 in which is slidably mounted a rib or key 26 formed longitudinally on the sleeve 18. Thus the sleeve is held against rotation relative to but can slide within the housing 22.

Another lug 27 is extended inwardly from the housing and holds a rotatable member 28 having an eccentrically disposed pin 29 projecting inwardly therefrom. Sleeve 18 has a transverse groove 30 into which this pin 29 projects and it will be obvious that by rotating the member 28 the pin 29 will slide sleeve 18 so as to force the teeth 21 into or out of engagement with the clutch member 16. Any suitable key operated means, not shown, can be provided for rotating the member 28 and it is not deemed necessary to describe or illustrate this mechanism in detail.

A steering wheel 31 has its hub 32 bearing on the closed upper end of housing 22 and this hub is held to the housing by means of screws 33 or the like inserted into the hub from within the housing. These screws have been shown in Fig. 4.

Spindle 12 is extended through the hub 32 and terminates in a threaded portion 34. An annular groove 35 is formed in the spindle near the threaded end thereof and seated therein are the opposed portions of a split washer 36. See Fig. 3. The sections of this washer are held to the hub 32 by pins 37 extending through the washer and into the hub. These pins are overhung and held in place by a cap nut 38 engaging the threaded portion 34. Locking pins 39 extend through the cap nut and also through the split washer and thence into the hub 32. All of these pins, after being forced into place will remain permanently in position because they will be held securely by friction and have no projecting portions that can be engaged for the purpose of withdrawing them.

The usual steering shaft 40 is mounted for rotation in the post 1 and has a head 41 at its upper end arranged between gear 13 and the bottom of the head 2. Head 41 has gears 42 mounted for rotation thereon, each of these gears meshing with gear 13 and with internal gear 5. A recess 43 is provided in the head 41 and shaft 40 for the reception of the reduced end 14 of spindle 12.

It will be understood that when the sleeve 18 is raised, as shown in Fig. 1, wheel 31 can rotate freely on spindle 12 and the steering mechanism will not be actuated. By rotating member 28 sleeve 18 can be shifted downwardly to bring the teeth 21 into engagement with the clutch member 16. Thus the wheel will be coupled to spindle 12 and, when rotated, will cause gear 13 to rotate the gears 42 and cause them to travel upon the internal gear 5, thereby to rotate head 41 and shaft 40. Obviously when the wheel is rotated the lower edge of the housing 22 will travel in the groove 23 provided, of course, the sleeve 18 and the clutch member 16 are coupled together.

If desired a supplemental split washer 44 can be used for holding the steering wheel 31 to the spindle 12. This washer projects into an annular groove 45 in the spindle and is bolted or otherwise fastened to the bottom of the hub 32 as shown at 46 extending through the upper end of housing 22.

What is claimed is:—

1. The combination with a steering post, a shaft journaled therein and a spindle, and means for transmitting motion from the spindle to the shaft, of a screw cap locked upon the post and having a concentric groove, a housing journaled at one end in the groove, a hand wheel secured to the housing, and key controlled means within the housing for coupling the housing to or uncoupling it from the spindle.

2. The combination with a steering post, a shaft journaled therein and a spindle, and means for transmitting motion from the spindle to the shaft, of a screw cap locked upon the post and having a concentric groove, a housing journaled at one end in the groove, a hand wheel secured to the housing, and key controlled means within the housing for coupling the housing to or uncoupling it from the spindle, said means including a clutch member rotatable with the spindle, a sleeve rotatable with but slidable within the housing, said sleeve having a groove, an eccentric shifting pin engaging the grooved sleeve and rotatable to move the sleeve into or out of engagement with the clutch member.

3. The combination with a steering post, a shaft therein, a spindle, and means for transmitting motion from the spindle to the shaft, of a screw cap for the post, means concealed by the cap and post for holding them against separation, a housing mounted for rotation on the cap and relative to the spindle, a steering wheel secured to the housing, key controlled means within the housing for coupling the housing to or uncoupling it from the spindle, and means for holding the spindle against withdrawal from the housing and steering wheel, said means including a split washer secured to the hub of the wheel, there being a groove in the spindle into which the washer projects, a cap nut engaging the end of the spindle, and a pin extending through the cap nut and washer and into the hub.

In testimony that I claim the foregoing as my own, I have hereto affixed my signature in the presence of two witnesses.

WARREN Z. WOODSTOCK.

Witnesses:
 LUCIEN V. JONES,
 GEORGE C. STRADLEY.